United States Patent [19]
Marousek

[11] Patent Number: 5,924,259
[45] Date of Patent: Jul. 20, 1999

[54] CORNER PIECE FOR SIDING RETAINERS

[76] Inventor: Robert Y. Marousek, 4941 E. 108th St., Garfield Hts., Ohio 44125

[21] Appl. No.: 09/024,468

[22] Filed: Feb. 17, 1998

[51] Int. Cl.[6] .................................................. E04F 19/02
[52] U.S. Cl. ...................... 52/656.1; 52/287.1; 52/656.9; 52/717.01; 52/745.16; 403/295; 403/341; 403/403
[58] Field of Search .............................. 52/656.9, 656.1, 52/211, 288.1, 278, 476, 475.1, 712, 657, 212, 123, 716.8, 717.01, 105, 287.1, 656.2, 716.1, 716.2, 730.6, 745.13, 745.15, 745.16; 403/401, 403, 405.1, 295, 341, 402

[56] References Cited

U.S. PATENT DOCUMENTS

| | | | |
|---|---|---|---|
| 2,663,390 | 12/1953 | Dordel | 52/204.53 |
| 3,103,710 | 9/1963 | Fredricksen . | |
| 3,877,138 | 4/1975 | Suchowski . | |
| 4,126,975 | 11/1978 | Williams | 52/211 |
| 4,205,470 | 6/1980 | Kapnek | 52/656.1 X |
| 4,222,209 | 9/1980 | Peterson | 52/656.1 X |
| 4,228,630 | 10/1980 | Englert et al. . | |
| 4,296,587 | 10/1981 | Berdan | 52/656.1 X |
| 4,608,800 | 9/1986 | Fredette . | |
| 4,683,634 | 8/1987 | Cole | 52/656.1 X |
| 4,704,838 | 11/1987 | Wendt | 52/716.1 X |
| 5,138,814 | 8/1992 | Giles et al. | 52/656.1 X |
| 5,437,130 | 8/1995 | Raynak | 52/211 X |
| 5,547,011 | 8/1996 | Dotson et al. | 52/656.9 X |
| 5,625,992 | 5/1997 | Strick et al. | 52/656.9 |

*Primary Examiner*—Carl D. Freidman
*Assistant Examiner*—Kevin D. Wilkens
*Attorney, Agent, or Firm*—Renner, Otto, Boisselle & Sklar, P.L.L.

[57] ABSTRACT

A corner piece used in cooperation with retainer strips and exterior siding provides improved protection to a wall of a structure, particularly around rectangular openings in the wall. The corner piece includes a first section extending in a first direction along a first side of the opening and a second section integral with the first section. The second section extends in a direction substantially perpendicular to the first section along a second side of the opening adjacent the first side. The first and second sections form a continuous channel that extends into the retainer strips. A first retainer strip may be received within the first section and the second section of the corner piece may be received within a second retainer strip. As a result, the channel formed by the first retainer strip overlaps a portion of the first section and the channel formed by the second section of the corner piece overlaps a portion of the second retainer strip. Thus, water flowing in the channel formed by the retainer strips and corner piece may flow from a retainer strip, over the corner piece and past another retainer strip with minimal opportunity for the water to flow behind either the corner piece or either of the retainer strips. In addition, the continuous channel formed by the corner piece and retainer strips directs water away from the wall by an angled bottom surface of the channel.

18 Claims, 4 Drawing Sheets

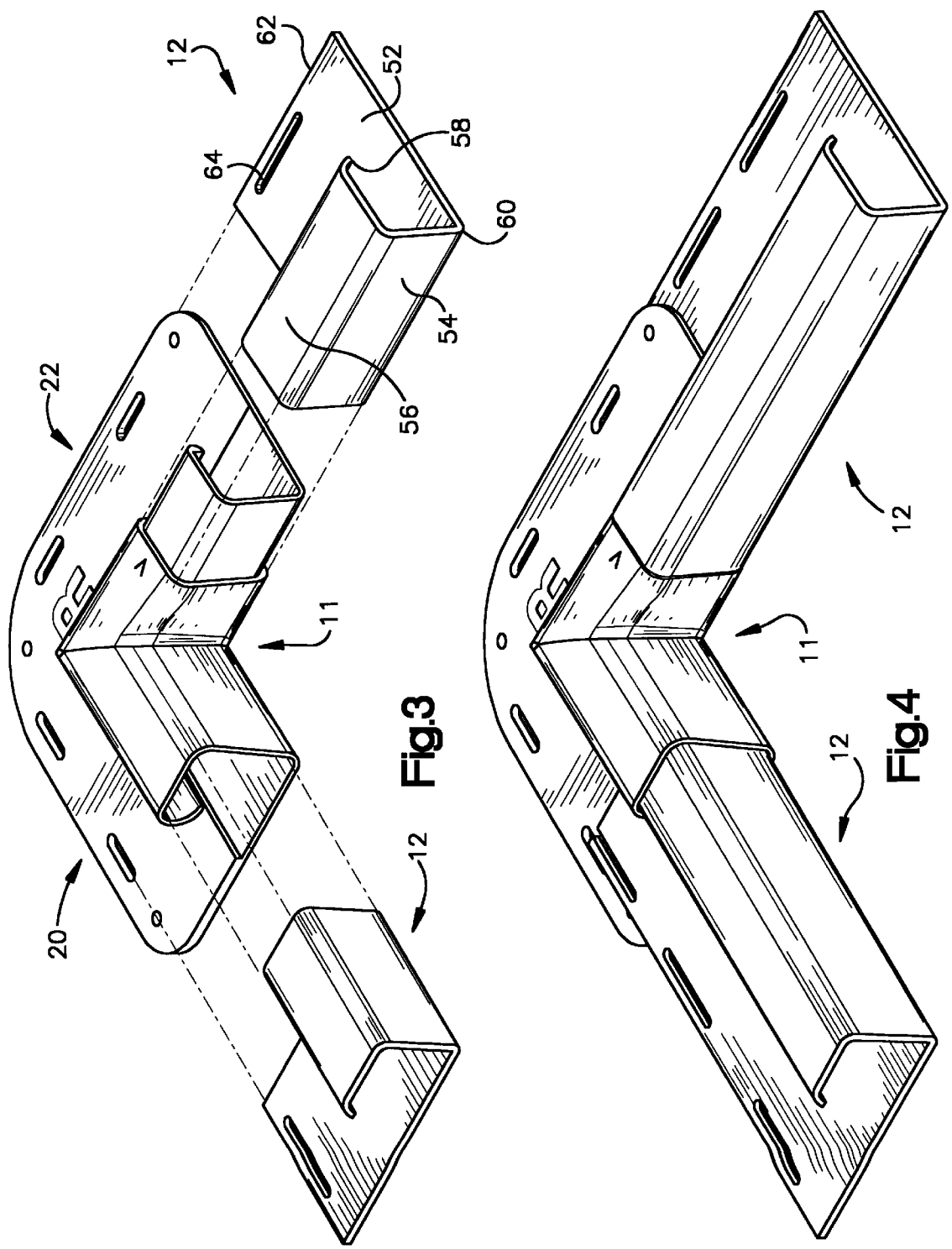

5,924,259

CORNER PIECE FOR SIDING RETAINERS

FIELD OF THE INVENTION

The invention described below relates generally to siding for covering the exterior walls of a structure, and more particularly, to siding retainers which frame the siding around rectangular openings in the walls.

BACKGROUND OF THE INVENTION

Siding is generally used to cover and protect the exterior walls of a structure or building. Such siding is often made of a weather resistant material such as aluminum or a synthetic material such as a vinyl. The siding is attached to the walls and trimmed at the edges with siding retainer strips. One type of retainer strip used around openings in the wall, such as windows and doors, is generally known as a J-channel due to its cross-sectional shape.

J-channel has a wide base portion which forms a strip that attaches to the wall adjacent a side of an opening in the wall. An extension portion projects continuously from a longitudinal edge of the base portion perpendicular to the base portion. A facing portion extends continuously from a distal edge of the extension portion substantially parallel to the base portion. The facing portion extends back over a fraction of the width of the base portion. These three portions together form a cross-sectional "J" shape and cooperate to form a channel between them.

The retainer strips, such as the J-channel, help hold the siding against the walls and cover the edges of the siding to minimize the amount of wind-blown moisture that may pass behind the siding and damage the walls. Corner pieces have been developed to improve the appearance of the J-channel strips adjacent the corners of rectangular openings where two strips of J-channel meet. Unfortunately, however, the prior art corner pieces permit water which condenses or is blown into the channel formed by the retainer strips to pass behind the corner piece and/or the retainer strips and damage the wall.

SUMMARY OF THE INVENTION

The present invention provides a corner piece used in cooperation with siding and retainer strips to form a system which provides improved protection to an exterior wall of a structure, particularly around rectangular openings in the wall. The corner piece according to the present invention minimizes or eliminates the opportunity for moisture to pass behind the corner piece or the retainer strips, thereby providing improved protection for the walls of a structure.

The corner piece according to an embodiment of the present invention is used with first and second retainer strips to frame rectangular openings in an exterior wall to be covered by siding. The corner piece includes a first section and a second section. The first and second sections have respective length dimensions which are substantially perpendicular to each other, and the second section is integral with the first section. Each of the first and second sections includes a wall plate which may be fastened to the wall; an extension which extends continuously from an inside edge of the wall plate adjacent the opening; and a facing member which extends substantially parallel to and over a portion of the wall plate from a distal edge of the extension. The respective wall plates, extensions and facing members of the first and second sections cooperate to form a continuous L-shaped channel. Furthermore, the extension and the wall plate form an angle between them which is greater than ninety degrees. The corner piece also may have a retainer flange extending at least from the facing member of the first section toward at least the wall plate of the first section. In addition, at least one of the first and second sections has a wall plate with openings through which fasteners can be placed to secure the corner piece to the wall. Furthermore, at least one wall plate has a width dimension which is greater than a width dimension of a corresponding facing member, and the openings are in a portion of the wall plate extending beyond the facing member.

According to one aspect of the present invention, each of the first and second retainer strips includes a substantially rectangular wall strip which is connectable to the wall adjacent a side of the opening, an extension strip extending continuously from a longitudinal edge of the wall strip and a facing strip extending over a portion of the wall strip from a distal edge of the extension strip. The wall strip, the extension strip and the facing strip form a channel. In addition, a portion of the second section of the corner piece is inset relative to the remainder of the second section such that the second section can be received within the channel of the second retainer strip. Preferably, the channel of the first section is adapted to receive the first retainer strip.

According to another aspect of the present invention, a transition between the inset portion and a non-inset portion of the second section of the corner piece forms an abutment surface which limits the extent to which the second section may be received in the second retainer strip.

According to another aspect of the present invention, the second portion extends in a direction which is ninety degrees clockwise from a direction in which the first portion extends, to form a right-hand corner piece which may be installed on a right side of the opening. Alternatively, the second portion extends in a direction which is ninety degrees counterclockwise from a direction in which the first portion extends, to form a left-hand corner piece which may be installed on a left side of an opening. The corner piece may include indicia which identify the corner piece as a right-hand corner piece or a left-hand corner piece.

A method of framing around a rectangular opening in an exterior wall to be covered by siding, according to the present invention, includes the steps of: securing a generally L-shaped corner piece to the wall adjacent a corner of the opening, connecting at least one generally J-shaped retainer strip to a section of the corner piece, and securing the retainer strip to the wall adjacent a side of the opening.

According to one aspect of the present invention, the step of connecting includes connecting a first retainer strip to the first section of the corner piece with the channel of the first section receiving the first retainer strip. The connecting step also includes connecting a second retainer strip to the second section of the corner piece with the channel of the second retainer strip receiving an inset portion of the second section so as to connect the channels in the first retainer strip, the corner piece, and the second retainer strip. The method also may include the step of connecting the retainer strip to a second corner piece, and may further include the step of trimming a length of the retainer strip before the step of connecting the retainer strip to the second corner piece.

The system according to the present invention frames at least two sides of a rectangular opening in an exterior wall to be covered by siding. The system includes at least one substantially horizontal and at least one substantially vertical retainer strip, and at least one corner piece having a first section and a second section. The first section forms a channel sized to receive a portion of a first retainer strip therein and the second section is adapted to be received within a channel of a second retainer strip.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

BRIEF DESCRIPTION OF THE DRAWINGS

FIG. 3 is an exploded perspective view of a right-hand corner piece according to the present invention and first and second retainer strips which connect to the corner piece.

FIG. 4 is a perspective view of the right-hand corner piece shown in FIG. 3 connected to the first and the second retainer strips.

DETAILED DESCRIPTION

Figure 5:
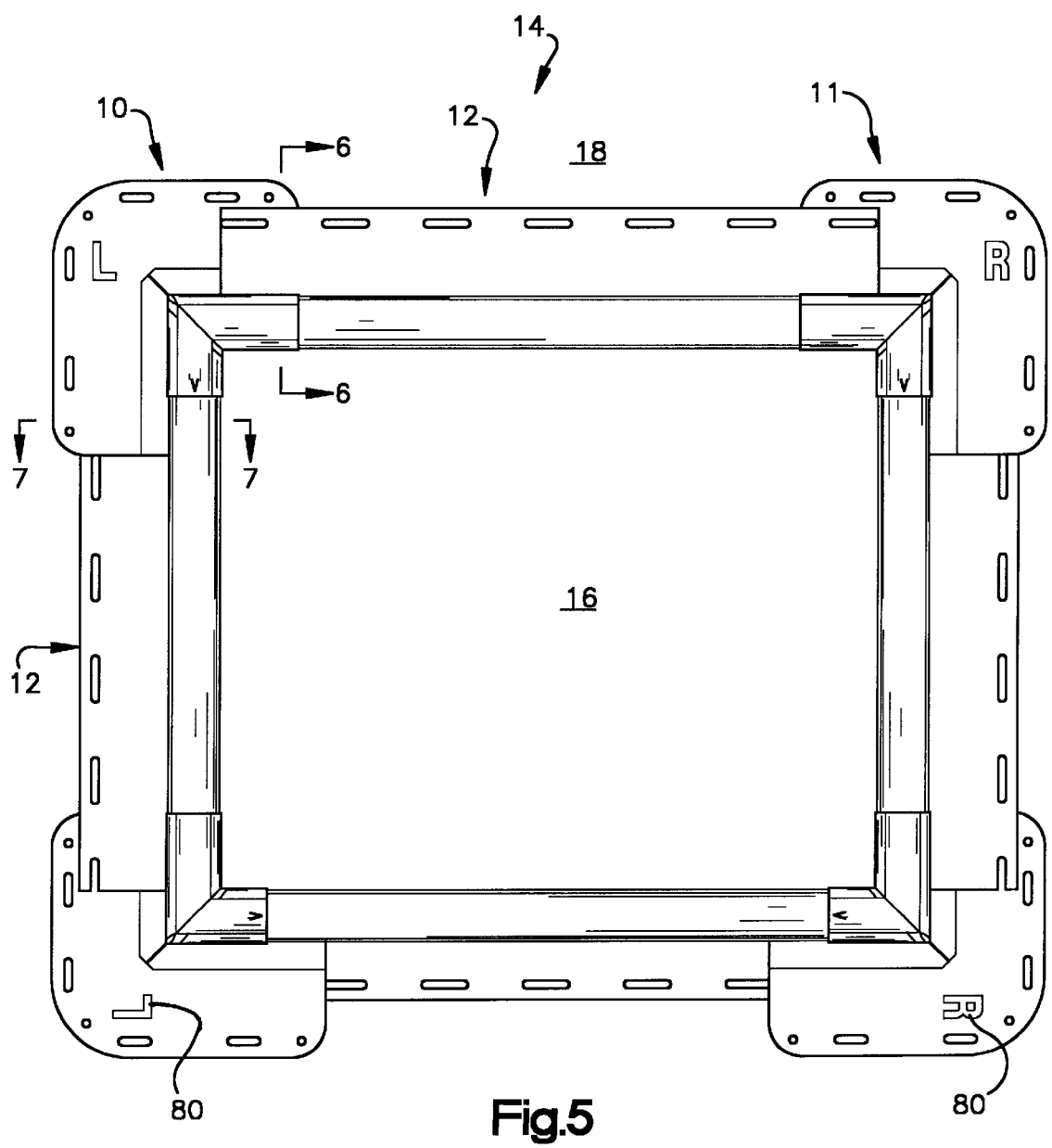
FIG. 5 is a plan view of four corner pieces according to the present invention as part of a system of framing around an opening in an exterior wall to be covered by siding.

Referring now in detail to the drawings, the present invention provides a corner piece (for example, a left-hand corner piece 10 (FIG. 1)) used in cooperation with retainer strips 12 (FIG. 3, for example) to form a system 14, shown in FIG. 5, to frame a rectangular opening 16 and to provide improved protection to an exterior wall 18 of a structure to be covered by siding.

Figure 1:
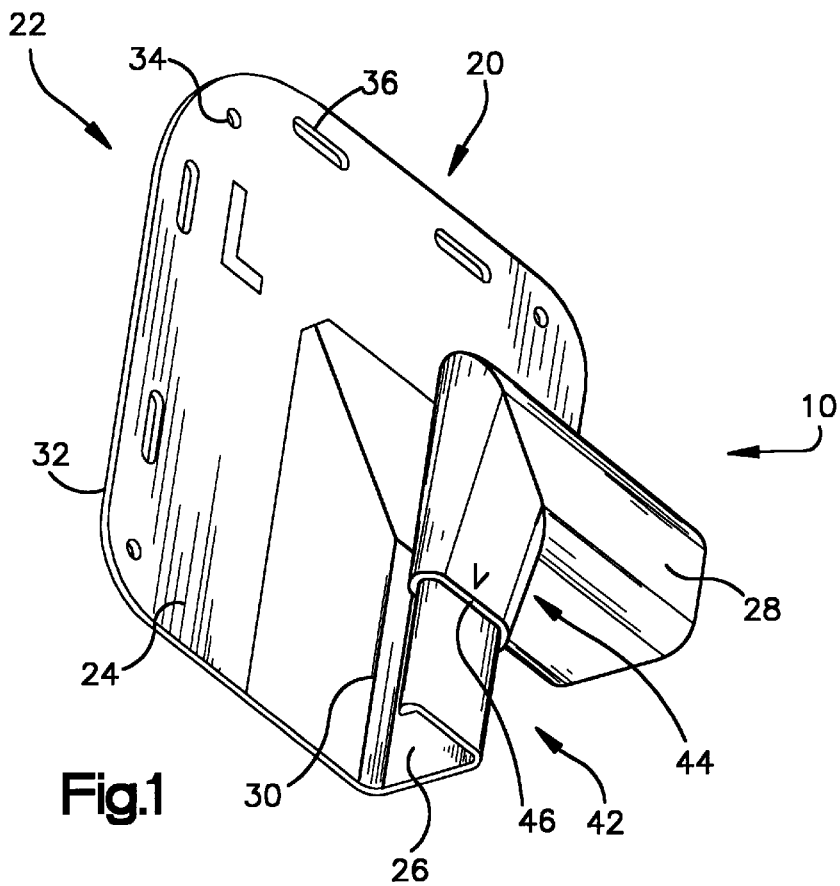
FIG. 1 is a perspective view of a front side of a left-hand corner piece according to the present invention used in framing around an opening in an exterior wall to be covered by siding.

FIGS. 1 and 3, for example, illustrate exemplary left-hand and right-hand corner pieces 10 and 11, respectively, according to the present invention. The left-hand and right-hand corner pieces are mirror images of one another and unless otherwise specified, the description of either type of corner piece applies to both, with their differences specifically noted.

Figure 6:
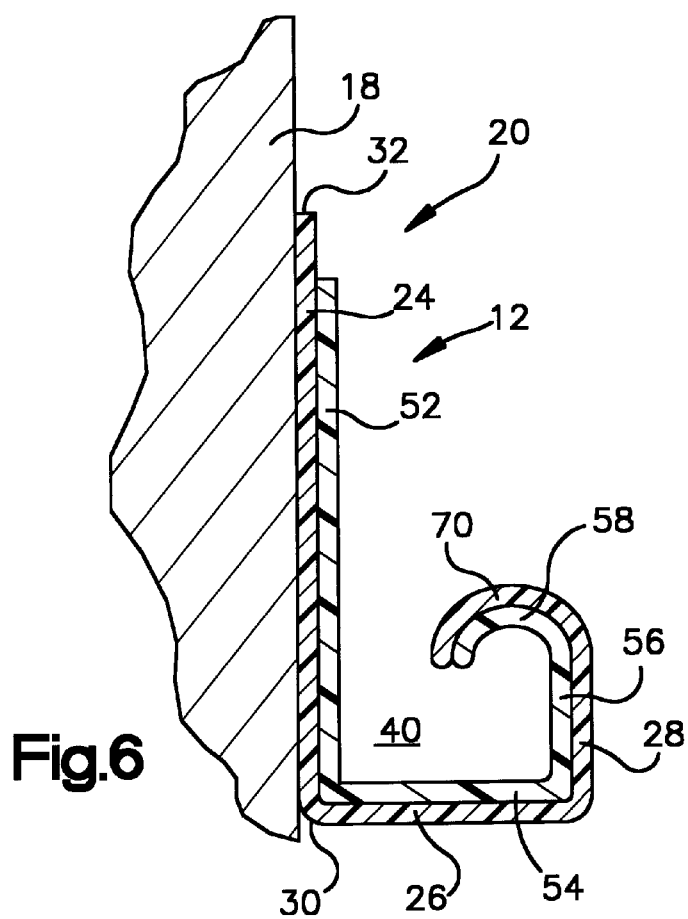
FIG. 6 is a schematic cross-section view illustrating the positional relationship of a first section of the corner piece according to the present invention with respect to the wall and the first retainer strip, as viewed along line 6—6 in FIG. 5.

Referring now to FIGS. 1 and 6, the corner piece 10 according to the present invention includes first and second sections 20 and 22 which form an L-shaped corner piece that extends continuously around a corner of the opening 16 in the wall 18. The first section 20 of the corner piece has a length dimension which extends in a first direction and in use is generally aligned along a first side of the opening. The second section, which is integral with the first section, has a length dimension which extends in a second direction which is substantially perpendicular to the first direction. In other words, the ends of the first and second sections overlap and are integral with one another at the corner. In use, the second section of the corner piece is generally aligned along a second side which is adjacent the first side of the opening.

The first and second sections each include a wall plate 24, an extension 26 and a facing member 28. The wall plate has an inside edge 30 and an outside edge 32. Adjacent the outside edge, the wall plate preferably has a series of openings 34 to receive fasteners (not shown) that secure the wall plate to the wall 18. Suitable fasteners include various nails, screws and other known fastening devices. The openings may include slots 36 which preferably permit the corner piece to be loosely attached to the wall such that its position may shift slightly as it is connected to the retainer strips. The corner piece also may be secured to the wall in a fixed position. Preferably the wall plate is secured to the wall with the inside edge adjacent the opening.

Each section 20 and 22 includes an extension 26 which extends continuously along the inside edge 30 of the wall plate 24. In use, the wall plate is secured to the wall 18 and the extension extends away from the wall to form an obtuse angle relative to the wall plate. Preferably the extension forms an angle of about ninety-six degrees relative to the wall plate. Extending from a distal end of the extension is the facing member 28 which is substantially parallel to the wall plate. The facing member is spaced from the wall plate by the extension and extends across the wall plate. The facing member is not as wide as the wall plate, however. Accordingly, the outside edge 32 of the wall plate extends beyond a distal end of the facing member, making the openings 34, which are adjacent the outside edge of the wall plate, easily accessible without interference from the facing member, thereby facilitating the installation of fasteners to secure the corner piece to the wall.

The wall plate 24, the extension 26 and the facing member 28 of the first section 20 are formed continuously and integrally with one another and with the respective wall plate, extension and facing member of the second section 22. In addition, the wall plate, the extension and the facing member of the first section form a channel between them, and the wall plate, extension and facing member of the second section form a channel between them. Preferably the channel has a draft of about one degree in each section as the channel progresses away from the other section. In other words, the inside surfaces of at least the wall plate and the facing member are angled so that the channel in the second section is smaller adjacent the first section than it is away from the first section. Likewise, the channel of the first section becomes progressively larger the farther it is from the second section. The channel in the first section and the channel in the second section are contiguous and form a continuous channel that extends from the first section to the second section, referred to generally below as the channel 40 of the corner piece 10.

Figure 2:
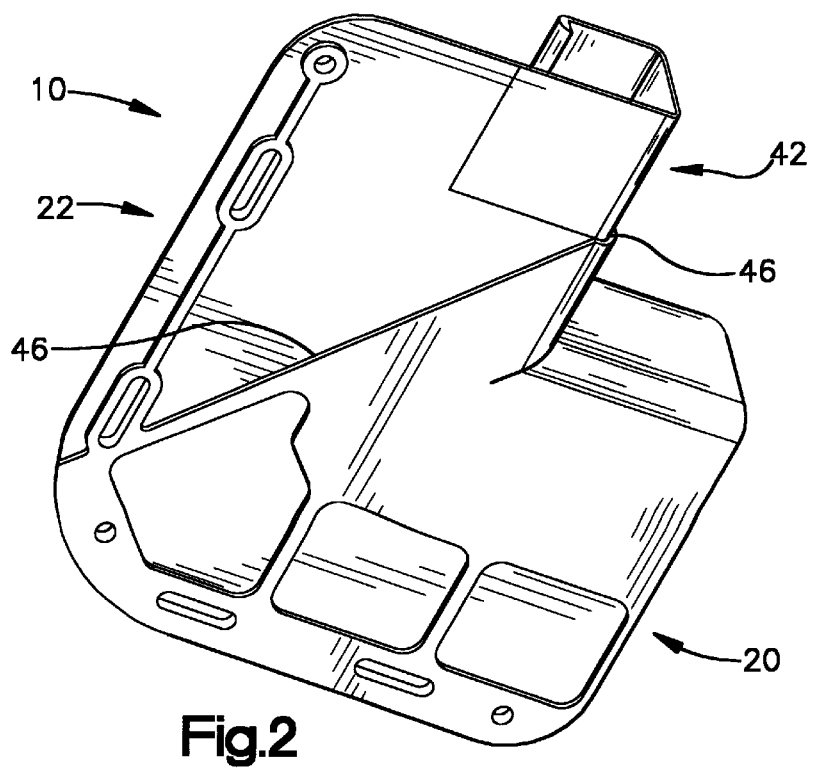
FIG. 2 is a perspective view of a back side of the left-hand corner piece shown in FIG. 1.

As shown in FIGS. 1 and 2, the second section 22 has an inset or recessed portion 42 on an outside surface which is relieved relative to the rest of that section and to the channel 40. As shown in FIG. 2, the recessed portion includes the outside surface, relative to the channel, of the wall plate which is securable to the wall. The recessed portion is adjacent a distal end of the second section away from the first section 20. The recessed portion is adapted to be received within a retainer strip as will be explained below. A portion of the second section of the corner strip that is not recessed (a nonrecessed portion 44) forms a stop or abutment surface 46 at the boundary between the recessed and nonrecessed portions of the second section. The abutment surface limits how far the recessed portion extends into the retainer strip. In other words, the retainer strip fits over the recessed portion of the corner piece 10 up to the abutment surface. The facing member of the nonrecessed portion of the second section is not parallel to the wall plate in the preferred embodiment because it is gradually sloped from the first section toward the recessed portion where a sudden change in thickness forms the abutment surface. In addition, another abutment surface may be formed inside the channel of the first section to limit the extent to which the first retainer strip may extend into the channel of the first section. This is not necessary to the proper operation of the invention, however.

Figure 7:
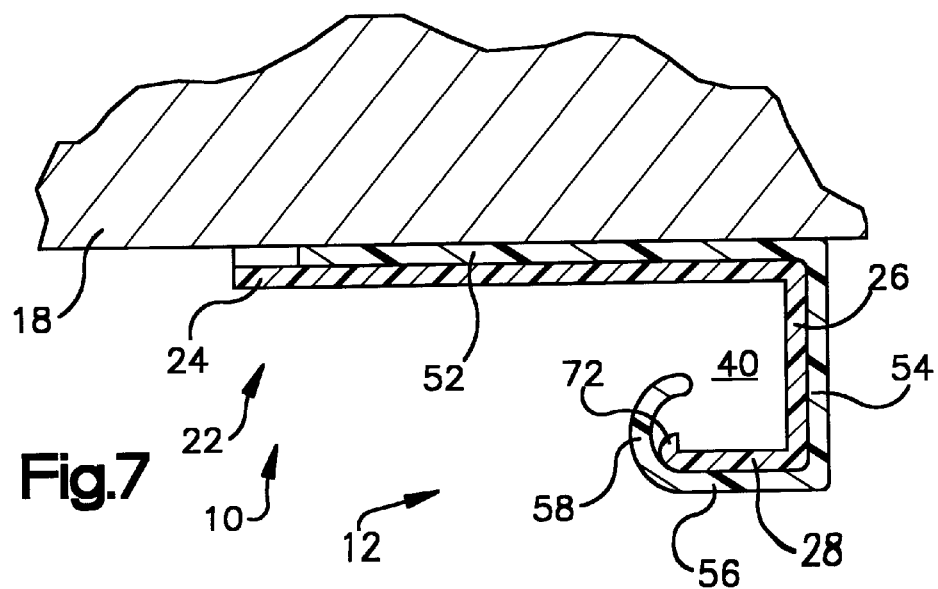
FIG. 7 is a schematic cross-section view illustrating the positional relationship of a second section of the corner piece according to the present invention with respect to the wall and the second retainer strip, as viewed along line 7—7 in FIG. 5.

FIGS. 3, 6 and 7, for example, illustrate exemplary first and second retainer strips 12 according to the present invention as used in cooperation with the right-hand corner piece 11. The first and second retainer strips are identical, therefore unless otherwise specified, the following description of the retainer strip applies to both.

The retainer strip 12 includes a wall strip 52, an extension strip 54 and a facing strip 56. The retainer strip also may include a flange strip 58. The wall strip includes an inner edge 60 and an outer edge 62 with a plurality of openings 64, such as holes and slots, adjacent the outer edge to receive fasteners which secure the wall strip to the wall. The slots also receive connectors from sections of the siding to hold the siding against the wall.

From the inside edge 60 of the wall strip 52, the extension strip 54 extends away from and forms an angle with respect to the wall strip which is greater than ninety degrees. Preferably the extension strip and the wall strip form an angle which is about ninety-six degrees. At a distal end of the extension strip, the facing strip 56 extends substantially parallel to and back across a portion of the wall strip. The outside edge 62 of the wall strip extends beyond a distal end of the facing strip to facilitate installation of fasteners and siding in the retainer strip. From a distal end of the facing strip, the flange strip 58 extends toward the wall strip. As in the corner piece, each of these components is integral with the others and they cooperate to form a channel between them. As shown in conjunction with a corner piece in FIGS. 6 and 7, the channel of the retainer strip is connected to and integral with the channel 40 of the corner piece when installed, as is further explained below.

Turning to FIGS. 3 and 4, the right-hand corner piece 11 is shown. The right-hand corner piece 11 differs from the left-hand corner piece in the relative positions of the first and second sections 20 and 22. The corner piece is adapted to interconnect with the retainer strips 12. An end of a first retainer strip is received within the first section 20 of the corner piece and the recessed portion 42 of the second section 22 of the corner piece is received within an end of a second retainer strip. Preferably the one degree draft in the channel of the first section helps to securely hold the retainer strip in the first section. The connected corner piece and retainer strips form a continuous section of framing that extends continuously from the first side of the opening to the second side of the opening in the wall. An advantage of the preferred illustrated corner piece is that because of the recessed portion 42, the first and second retainer strips are identical and connect with either section of the corner piece in the preferred manner. Other advantages of this manner of connection will be clear from the following description.

Returning to FIGS. 6 and 7, the cross-sectional shapes of the connected retainer strips 12 and the first and second sections 20 and 22 of the corner piece are substantially identical. The wall strips 52 parallel the wall plates 24, the extension strips 54 parallel the extensions 26 and the facing strips 56 parallel the facing members 28. Preferably the extensions and the extension strips form substantially the same angles relative to the wall plate and the wall strip, respectively, to minimize the size of the gap formed between them, to provide a close fit and to prevent or minimize the opportunity for moisture to pass between them. Preferably the inherent elasticity of the material used to form the retained strips further ensures a tight fit.

In addition to the above described components of the corner piece 10, the first and second sections also may include retainer flanges 70 and 72 extending toward the wall plate 24 from a distal end of the facing member 28 to reduce the opportunity for moisture to penetrate between the corner piece and the retainer strip 12. The retainer flange helps hold the retainer strip and/or an edge of a section of siding (not shown) within the channel 40. In the second section 22 (FIG. 7) the retainer flange 72 preferably engages an inner surface of the flange strip 58 of the retainer strip to hold the retainer strip against the outside surface of the corner piece. In contrast, in the first section 20 (FIG. 6) the retainer flange 70 is larger and extends over the substantially similarly shaped flange strip of the retainer strip to cover the junction between the retainer strip and the corner piece. The flange strip of the retainer strip and the retainer flange of the first section may also engage a section of siding to further minimize the amount of moisture that drains into or is blown into the channel. In both sections, the retainer flange prevents moisture from entering the gap between the retainer strip and the corner piece.

Preferably the retainer strip 12 may be held in place by the corner piece 10, although this is not necessary since the retainer strip is separately secured to the wall 18. However, by holding the retainer strip in place, the corner piece according to the preferred embodiment allows the installer to flex the retainer strip away from the wall, to trim a distal end of the retainer strip to the desired length, and to secure the retainer strip to the wall and a second corner piece without also having to hold the retainer strip in place, thus increasing the efficiency with which the system can be installed.

An exemplary embodiment of the system 14 for framing the opening 16 in the wall 18 is shown in FIG. 5. The system includes corner pieces 10 and 11 and retainer strips 12 which extend continuously around four sides of the opening, which may represent a window, for example. Alternatively, the system may frame three or fewer sides of an opening (for example, around a door) preferably framing at least a top side of the opening. The illustrated system includes two right-hand corner pieces 11 on the right side of the opening, two left-hand corner pieces 10 on the left side of the opening, and horizontal and vertical retainer strips interconnecting the right-hand and left-hand corner pieces. The upper horizontal retainer strip is a first retainer strip relative to both of the upper corner pieces and the lower horizontal retainer strip is a second retainer strip relative to both lower corner pieces. In contrast, the vertical retainer strips are second retainer strips relative to the upper corner pieces and first retainer strips relative to the lower corner pieces.

The two right-hand corner pieces 11 are identical and the two left-hand corner pieces 10 are identical with the right-hand and left-hand corner pieces being mirror images of one another as previously mentioned. As shown in FIG. 5, the upper left-hand corner piece has a horizontal first section 20 which extends in a direction ninety degrees counterclockwise from the vertical second section 22. In contrast, in the upper right-hand corner piece, which also has a horizontal first section and a vertical second section, the first section extends in a direction which is ninety degrees clockwise from the second section. The lower corner pieces are rotated ninety degrees from the orientation of the upper corner pieces so that the inside edge of the corner piece aligns with two adjacent sides of the opening. Accordingly, the lower right-hand corner piece is rotated clockwise and the lower left-hand corner piece is rotated counterclockwise from the orientation of their respective upper counterparts (compare FIGS. 1 and 3). In addition, the right-hand or the left-hand nature of the corner piece preferably is indicated by indicia 80 such as "R" or "L" to facilitate identification and installation of the right-hand and the left-hand corner pieces, respectively.

The system 14 according to the present invention works as follows. Since the left-hand and right-hand corner pieces 10 and 11 are substantially identical, the following description applies equally to either side of the system. Moisture which enters the channel 40 of the top horizontal retainer strip 12 will flow toward the upper left-hand corner piece 10, for example. As a first retainer strip relative to the upper left-hand corner piece, the horizontal first retainer strip overlaps the horizontal first section 20 of the corner piece. In other words, the channel formed by the first retainer strip lies within the channel formed by the first section of the corner piece (see FIG. 6). The moisture flows from the retainer strip to the corner piece and away from the gap between the extension and the extension strip.

As noted previously, the gap between the extension 26 and the extension strip 54 is as small as possible to prevent moisture from flowing between them. Preferably the retainer strip 12 fits tightly within the first section 20 of the corner piece 10 such that there are minimal or no gaps between them. However, as shown in FIG. 6, if the moisture flows into this gap, the angled nature of the extension and the extension strip relative to the wall plate 24 and the wall strip 52, respectively, directs the moisture away from the wall 18. As a result, the outer end of the first section and the outside surface of the junction between the extension strip and the facing strip 56 act as drip edges which direct the moisture away from and which prevent the moisture from flowing toward the wall.

Returning to the upper left-hand corner piece 10 and FIG. 5, the moisture flows from the horizontal first section 20, around the corner and down the vertical second section 22. Since the vertical retainer strip 12 is a second retainer strip relative to the upper left-hand corner piece, the inset portion 42 of the second section of the corner piece is received within the channel of the vertical retainer strip. In other words, the inset portion of the second section overlaps the vertical retainer strip and the moisture flows from the second section to the vertical retainer strip under the influence of gravity and is prevented by gravity from passing between the second section of the corner piece and the vertical retainer strip.

From the vertical retainer strip 12 the moisture flows down to the lower left-hand corner piece 10. The lower left-hand corner piece is identical to the upper left-hand corner piece and is rotated ninety degrees relative to the orientation of the upper corner piece. In contrast to the upper left-hand corner piece, however, in this orientation the first section is vertical and the second section is horizontal. The vertical retainer strip is now a first retainer strip relative to the lower left-hand corner piece and thus overlaps the first section and gravity prevents the moisture from flowing up and between the retainer strip and the corner piece. From the first section the moisture continues its downward flow and runs off the corner piece onto the siding or the ground.

Therefore, the corner piece 10, retainer strip 12 and the system 14 formed of corner pieces and retainer strips according to the present invention, provide increased protection to a wall 18 around an opening 16 by directing moisture around the opening and away from the wall.

The present invention also contemplates a method of framing around the rectangular opening in the exterior wall to be covered by siding. The method includes at least the steps of securing the generally L-shaped corner piece 10 or 11 to the wall 18 adjacent a corner of the opening 16, connecting at least one of the generally J-shaped retainer strips 12 to a section 20 or 22 of the corner piece, and securing the retainer strip to the wall adjacent a side of the opening. The corner piece may be connected to the wall by inserting fasteners through one or more slots 36 in the corner piece. This allows the corner piece to move or shift position while the retainer strips are being connected. Fasteners may then be inserted through one or more holes 34 to fix the position of the corner piece.

In connecting the corner piece 10 to the retainer strip 12, generally the corner pieces are attached adjacent the opening 16 and then the retainer strips are connected first to the second section 22 of a first corner piece and then to the first section 20 of a second corner piece. The retainer strip may be connected to a first section by inserting the facing strip 56 and the extension strip 54 in the channel 40 of the first section and then rotating the retainer strip until the wall strip 52 parallels the wall plate 24. The retainer strip may be connected to the second section by sliding the retainer strip over the inset portion 42 until the end of the retainer strip contacts the abutment surface 46. Preferably the retainer strips snap in place. In addition, the retainer strip preferably has some flexibility and elasticity so that method may also include the steps of flexing the retainer strip away from the wall and trimming the retainer strip before connecting the retainer strip to the second corner piece. The method preferably includes connecting the retainer strip to the second section of the corner piece before connecting the retainer strip to the first section of the second corner piece. Since the first section covers the facing strip of the retainer strip, the retainer strip advantageously may be trimmed to any length that is received to a greater or lesser extent within the first section of the corner piece. In addition, the abutment surface 46 on the wall plate in the second section of the corner piece (see FIG. 2) is preferably angled from the inner edge 30 toward the outer edge 32 and the first section 20 to further enlarge the recessed portion 42 so that imperfectly trimmed retainer strips may contact the abutment surface on the facing member 28 more precisely. In addition, the abutment surface on the extension is also preferably angled from the abutment surface on the facing member toward the first section. Not only is this more aesthetically pleasing, it prevents moisture from entering via the intersection of the second retainer strip and the second section of the corner piece.

The corner piece preferably is formed of a durable, easily formable and inexpensive material which is resistant to environmental conditions. Preferably, although not necessarily, the corner piece, the retainer strips and the siding are formed of the same material. The corner piece may be formed of aluminum, and preferably is formed of a plastic vinyl material, particularly a form of polyvinyl chloride (PVC).

Although the corner pieces of the present invention are intended for use around rectangular openings in a wall, such as doors and windows, the corner pieces may also be used adjacent protruding external or outside corners of a wall or other parts of a building to be covered with siding.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

What is claimed is:

1. A system which frames at least two sides of a rectangular opening in an exterior wall to be covered by siding, the system comprising:

at least one substantially horizontal and at least one substantially vertical retainer strip, each retainer strip including a substantially rectangular wall strip, an extension strip extending continuously from a longitudinal edge of the wall strip, and a facing strip extending continuously from a distal edge of the extension strip; the wall strip, the extension strip and the facing strip forming a channel between them; and at least one corner piece having a first section and a second section, each section including a wall portion, an extension portion forming an obtuse angle relative to the wall portion, the extension portion continuously connected along an inside edge of the wall portion, and a facing portion substantially parallel to the wall portion and spaced therefrom by the extension portion, the facing portion being connected continuously from a distal edge of the extension portion, the wall portion, the extension portion and the facing portion cooperating to form a channel between them;

wherein the first and second sections are formed integrally with one another, a longitudinal dimension of the first section being substantially perpendicular to a longitudinal dimension of the second section;

wherein the first section forms a channel sized to receive a portion of a first retainer strip therein and the second section is sized to fit within a channel of a second retainer strip.

2. A corner piece for use with first and second retainer strips to frame rectangular openings in an exterior wall to be covered by siding, the corner piece comprising:

a first section and a second section having respective length dimensions which are substantially perpendicular to each other, the second section integral with the first section, each of the first and second sections includes a wall plate which may be fastened to the wall; an extension which extends continuously from an inside edge of the wall plate; and a facing member which extends substantially parallel to and over a portion of the wall plate from a distal edge of the extension;

wherein the respective wall plates, extensions and facing members of the first and second sections cooperate to form a continuous L-shaped channel;

wherein each of the first and second retainer strips includes a substantially rectangular wall strip, an extension strip extending continuously from a longitudinal edge of the wall strip and a facing strip extending over a portion of the wall strip from a distal edge of the extension strip, the wall strip, extension strip and facing strip forming a channel;

wherein at least a portion of the second section of the corner piece is sized to fit within the channel of the second retainer strip; and wherein the first section is sized so that the first retainer strip fits within the channel of the first section.

3. A corner piece for use with first and second retainer strips to frame rectangular openings in an exterior wall to be covered by siding, the corner piece comprising:

a first section and a second section having respective length dimensions which are substantially perpendicular to each other, the second section integral with the first section, each of the first and second sections includes a wall plate which may be fastened to the wall; an extension which extends continuously from an inside edge of the wall plate; and a facing member which extends substantially parallel to and over a portion of the wall plate from a distal edge of the extension;

wherein the respective wall plates, extensions and facing members of the first and second sections cooperate to form a continuous L-shaped channel; and wherein each extension and respective wall plate form an angle between them which is greater than ninety degrees;

wherein each of the first and second retainer strips includes a substantially rectangular wall strip which is connectable to the wall adjacent a side of the opening, an extension strip extending continuously from a longitudinal edge of the wall strip and a facing strip extending over a portion of the wall strip from a distal edge of the extension strip, the wall strip, extension strip and facing strip forming a channel;

wherein a portion of the second section of the corner piece is inset relative to the remainder of the second section such that the second section can be received within the channel of the second retainer strip; and wherein the channel of the first section is adapted to receive the first retainer strip.

4. The corner piece of claim 3, further comprising a retainer flange extending at least from the facing member of the first section toward at least the wall plate of the first section.

5. The corner piece of claim 3, wherein the wall plate of at least one of the first and second sections has openings through which fasteners can be placed to secure the corner piece to the wall.

6. The corner piece of claim 5, wherein the wall plate of at least one of the first and second sections has a width dimension which is greater than a width dimension of a corresponding facing member, and the openings are in a portion of the wall plate extending beyond the facing member.

7. The corner piece of claim 5, wherein the openings are adjacent an outside edge of the wall plate.

8. The corner piece of claim 3, wherein the channel formed by the first and second sections of the corner piece has a draft of about one degree in each section.

9. The corner piece of claim 3, wherein a transition between the inset portion and a non-inset portion of the second section of the corner piece forms an abutment surface which limits the extent to which the second section may be received in the second retainer strip.

10. The corner piece of claim 3, wherein a portion of an outside surface formed by the wall plate, the extension, and the facing member of the second portion is relieved to form the inset portion.

11. The corner piece of claim 3, wherein the second portion extends in a direction which is ninety degrees clockwise from a direction in which the first portion extends, to form a right-hand corner piece which may be installed on a right side of the opening.

12. The corner piece of claim 11, further comprising indicia which identify the corner piece as a right-hand corner piece.

13. The corner piece of claim 3, wherein the second portion extends in a direction which is ninety degrees counterclockwise from a direction in which the first portion extends, to form a left-hand corner piece which may be installed on a left side of an opening.

14. The corner piece of claim 13, further comprising indicia which identify the corner piece as a left-hand corner piece.

15. The corner piece of claim 3, wherein the corner piece is formed of a durable, easily formable and inexpensive material which is resistant to environmental conditions.

16. A method of framing around a rectangular opening in an exterior wall to be covered by siding, the method comprising the steps of:

securing a generally L-shaped corner piece to the wall adjacent a corner of the opening, the corner piece including a first section and a second section integral with the first section, the first and second sections having respective length dimensions which are substantially perpendicular to each other, each of the first and second sections having a wall plate fastened to the wall; an extension which extends continuously from an inside edge of the wall plate; and a facing member which extends substantially parallel to and over the wall plate from a distal edge of the extension, the respective wall plates, extensions and facing members of the first and second sections cooperating to form a continuous L-shaped channel, wherein the extension and the wall plate form an angle greater than ninety degrees;

connecting at least one generally J-shaped retainer strip to the corner piece, the retainer strip including a substantially rectangular wall strip, an extension strip extending continuously from a longitudinal edge of the wall strip, and a facing strip extending continuously from a distal edge of the extension strip, and the wall strip, the extension strip and the facing strip forming a channel between them; and securing the retainer strip to the wall adjacent a side of the opening;

wherein the step of connecting includes connecting a first retainer strip to the first section of the corner piece, the channel of the first section receiving the first retainer strip and connecting a second retainer strip to the second section of the corner piece, the channel of the second retainer strip receiving an inset portion of the second section, the connecting step continuously connecting the channels in the first retainer strip, the corner piece, and the second retainer strip.

17. The method of claim 16, further comprising the step of connecting the first or the second retainer strip to a second corner piece.

18. The method of claim 17, further comprising the step of trimming a length of the first or the second retainer strip before the step of connecting the first or the second retainer strip to the second corner piece.

* * * * *